(12) United States Patent
Kim et al.

(10) Patent No.: US 6,954,937 B2
(45) Date of Patent: Oct. 11, 2005

(54) DISC GUIDE DEVICE FOR DISC PLAYER

(75) Inventors: Tae-myun Kim, Gyeonggi-do (KR); Young-bok Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 10/438,208

(22) Filed: May 15, 2003

(65) Prior Publication Data

US 2004/0027963 A1 Feb. 12, 2004

(30) Foreign Application Priority Data

Aug. 7, 2002 (KR) ........................................ 2002-46558

(51) Int. Cl.[7] .......................... G11B 17/03; G11B 17/04
(52) U.S. Cl. ................................................... 720/616
(58) Field of Search ................................ 720/616, 615, 720/601, 603, 605, 613

(56) References Cited

U.S. PATENT DOCUMENTS 5,867,338 A * 2/1999 Ohira et al. ................ 720/627
6,538,971 B2 * 3/2003 Seo et al. .................... 720/616
2004/0013071 A1 * 1/2004 Obata et al. ................ 369/75.2

FOREIGN PATENT DOCUMENTS

| JP | 08167215 A | * 6/1996 | ........... G11B/17/04 |
| JP | 2000-293916 | 10/2000 | |

* cited by examiner

Primary Examiner—William J Kilmowicz
(74) Attorney, Agent, or Firm—Staas & Halsey LLP (57) ABSTRACT

A disc guide device for guiding and placing a disc cartridge and a bare disc in a predetermined position on a tray of a disc player. When a bare disc is loaded on the tray, a guide portion is projected through and above a guide hole by the elastic force of a spring to contact the circumference of the disc. When a disc cartridge is loaded on the tray, a protrusion is inserted into a reference hole, and the guide portion is pressed down by the disc cartridge and buried below the guide hole. Since the device guiding the disc cartridge and the device guiding the bare disc are integrated in the disc guide device, it is possible to fabricate the disc guide device with fewer parts, lower material cost, and with a simpler structure.

23 Claims, 6 Drawing Sheets

DISC GUIDE DEVICE FOR DISC PLAYER

BACKGROUND OF THE INVENTION

This application claims the priority of Korean Patent Application No. 2002-46558, filed on Aug. 7, 2002, in the Korean Intellectual Property Office, the disclosure of which is incorporated herein in its entirety by reference.

1. Field of the Invention

The present invention relates to a disc player in which a disc cartridge and a bare disc can be compatibly used, and more particularly, to a disc guide device for a disc player, by which a disc cartridge or a bare disc is guided to and correctly placed in a predetermined position on a tray.

2. Description of the Related Art

A disc player is an apparatus for recording onto and/or reading information from a disc shaped recording medium such as a compact disc (CD) or a digital video disc (DVD) using an optical beam. As the density of information stored on a disc increases, recording and reading efficiency of the disc is greatly affected by dust, scratches, or fingerprints on the disc. That is, as more information is integrated on the disc of a constant size, the optical spot irradiated for recording or reading the information is necessarily reduced. Accordingly, recording or reading of information by the optical spot is occasionally disturbed by a very tiny substance or abnormality on the disc. To protect the disc from dust, scratches, fingerprints, or the like, a disc cartridge containing a disc to be rotated therein is widely used as a recording medium for recording multimedia information such as audio and video, etc.

Figure 1:
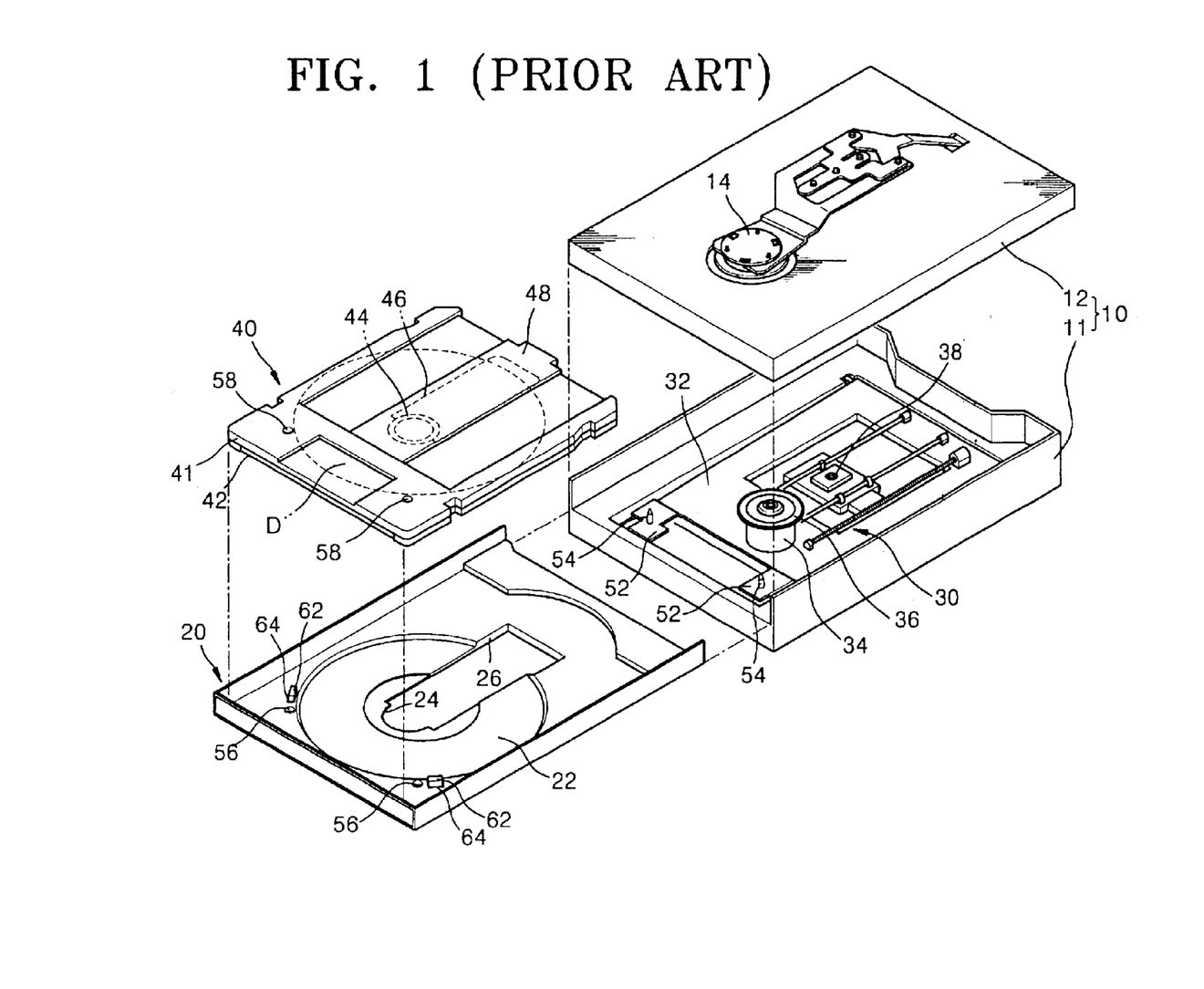
FIG. 1 is an exploded perspective view of a conventional disc player.

FIG. 1 is an exploded perspective view of a conventional disc player in which a disc cartridge and a bare disc can be compatibly used. Referring to FIG. 1, the conventional disc player includes a housing 10 having a main frame 11 and a cover plate 12 that is assembled onto the main frame 11, and a tray 20, that is installed to move into and out of the housing 10, for carrying a disc cartridge 40 or a bare disc.

A deck assembly 30 is mounted within the housing 10. The deck assembly 30 includes a deck plate 32 typically made of metal, a spindle motor 34 that is mounted on the deck plate 32 and rotates the disc, and an optical pickup 38 that is also mounted on the deck plate 32 and reproduces data recorded on the disc being rotated. A turntable 36 for placing the disc thereon is mounted onto the spindle motor 34. A rear end of the deck assembly 30 is hinged with the main frame 11. A front end of the deck assembly 30 is engaged with a lift device (not shown) mounted on the main frame 11. The spindle motor 34 is mounted near the front end of the deck assembly 30.

In FIG. 1, there is also shown a disc cartridge 40 containing a double-sided disc D for recording information on both sides of the disc. The disc cartridge 40 includes: upper and lower cases 41 and 42 forming a space for containing the disc D therein; center holes 44, that are formed in the upper and lower cases 41 and 42, respectively, and accommodate the turntable 36 and a clamp 14 to be described below; windows 46 that are formed in the connection with the center holes 44 in the upper and lower cases 41 and 42, respectively, and allow the optical pickup to 38 access the disc D; and shutters 48 formed on outer surfaces of the upper and lower cases 41 and 42, respectively, and selectively open or close the center holes 44 and the windows 46. In a case of a single-sided disc for recording information on only one side of the disc, the window may be formed only in the lower case.

The cover plate 12 has a disc clamp 14, for keeping the disc D contained in the disc cartridge 40, or for keeping the bare disc in close contact with the turntable 36 of the spindle motor 32. The cover plate 12 also has an opening lever (not shown) for opening or closing the shutters 48 of the disc cartridge 40.

The disc cartridge 40 or the bare disc is loaded on the tray 20. A disc receptacle 22 is provided on the tray 20 for correctly placing the bare disc. Further, in correspondence with the center holes 44 and the windows 46, respectively, the tray 20 has a center hole 24 for accommodating the turntable 36, and a window 26 that is formed in connection with the center hole 24 and allows the optical pickup 38 to access the disc D.

The conventional disc player as described above additionally includes a disc guide device, by which the disc cartridge 40 or the bare disc is guided to and correctly placed at a predetermined position on the tray 20. In a conventional disc guide device, device for guiding the disc cartridge 40 and device for guiding the bare disc are separately provided.

The conventional device guiding and correctly placing the disc cartridge 40 in a predetermined position on the tray 20 includes a pair of reference holes 58 provided in the disc cartridge 40, a pair of shafts 54 provided on a pair of brackets 52 extending from both sides of the front end of the deck plate 32, and a pair of perforations 56 provided in the tray 20. The shafts 54 of the deck plate 32 are inserted into the reference holes 58 of the disc cartridge 40 through the perforations 56 of the tray 20, respectively, when the tray 20 loading the disc cartridge 40 is moved into the housing 10. To prevent the reference holes 58 from interfering with the circumference of the disc D, the reference holes 58 are provided adjacent to the outer circumference of the disc D. The brackets 52 extending from the front end of the deck plate 32 are required to correctly position the shafts 54 to correspond to the reference holes 58. The shafts 54 are generally made of metal, and are fixed to the brackets 52.

The conventional device guiding and correctly placing the bare disc in a predetermined position on the tray 20 includes a pair of guide holes 64 formed in the tray 20, and a pair of disc guides 62 installed on the tray 20. The disc guides 62 are installed to be above the surface of the tray 20 when the bare disc is loaded. But when the disc cartridge 40 is loaded, the disc guides 62 are elastically depressed through the guide holes 64 to a predetermined position below the surface of the tray 20. The disc guides 62 are provided adjacent to the outer circumference of the disc and the disc receptacle 22 of the tray 20.

Figure 2:
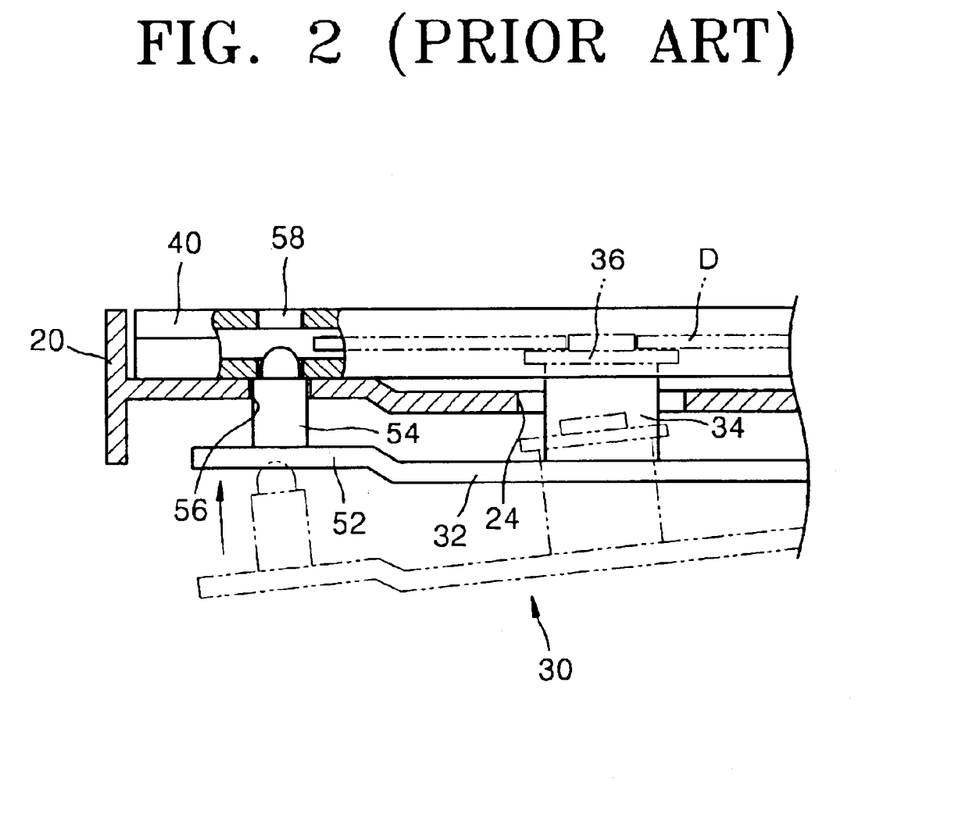
FIG. 2 shows operations of the shafts to be inserted into the reference holes in the conventional disc guide device of FIG. 1 when the disc cartridge is loaded on the tray.

FIG. 2 shows operations of the shafts 54 to be inserted into the reference holes 58 in the conventional disc guide device shown in FIG. 1 when the disc cartridge is loaded on the tray. Referring to FIG. 2, when the tray 20 loading the disc cartridge 40 is moved into the housing 10 shown in FIG. 1, the front end of the deck assembly 30 is moved up. Accordingly, the spindle motor 34 mounted on the deck assembly 30 is also moved up to pass through the center hole 24 formed in the tray 20 so that the disc D contained in the disc cartridge 40 is placed on the turntable 36. In addition, the shafts 54 provided on the brackets 52 extending from the front end of the deck plate 32 are also moved up so that upper portions of the shafts 54 are inserted through the perforations 56 formed in the tray 20, and into the reference holes 58 formed in the disc cartridge 40. Thus, the disc cartridge 40 can be correctly placed in a predetermined position.

Figure 3A:
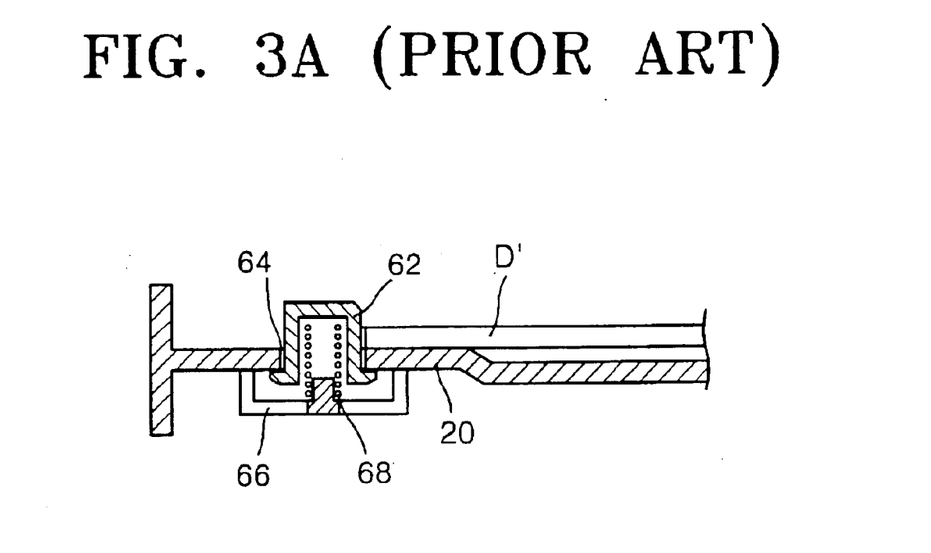
FIGS. 3A and 3B show operations of the disc guides in the conventional disc guide device of in FIG. 1 when a bare disc is loaded on the tray and when a disc cartridge is loaded, respectively.

FIGS. 3A and 3B show operations of the disc guides in the conventional disc guide device shown in FIG. 1 when a bare disc is loaded on the tray and when a disc cartridge is loaded, respectively. Referring to FIG. 3A, when a bare disc D' is loaded on the tray 20, the disc guides 62 are projected through and above guide holes 64 by an elastic force such as springs 68. As the circumference of the bare disc D' contacts the side walls of the disc guides 62, the disc D' is not displaced from a predetermined position, even if the tray 20 vibrates while it is moving. Brackets 66 are provided for supporting the springs 68 under the bottom of the tray 20.

Figure 3B:
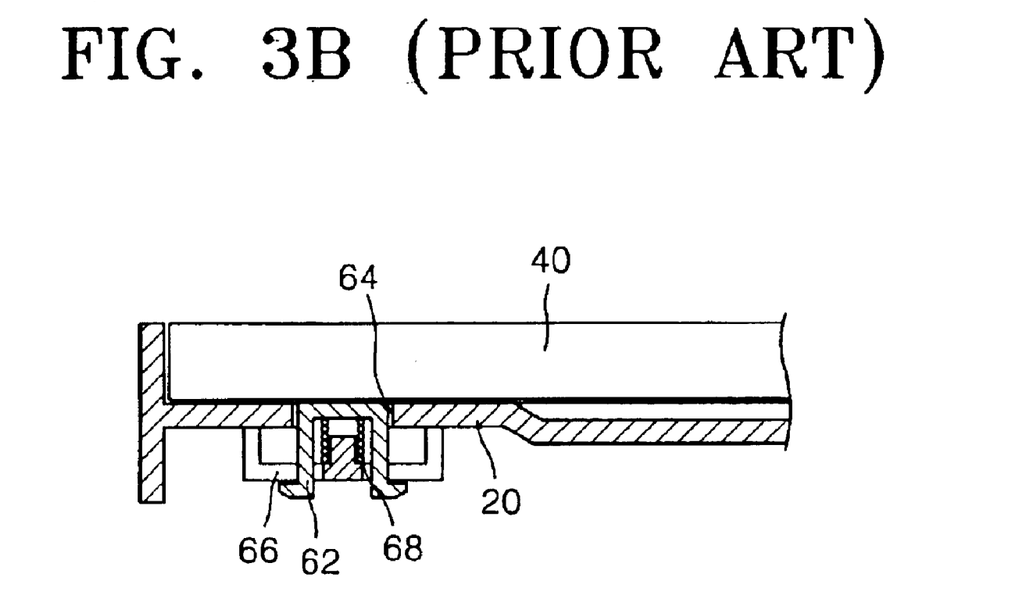

Referring to FIG. B, when a disc cartridge 40 is loaded on the tray 20, the disc guides 62 are pressed down by the disc cartridge 40, thereby compressing the springs 68, and locating the disc guides 62 below the guide holes 64, so as not to interfere with the disc cartridge 40. Thus, correct placement of the disc cartridge 40 is achieved by the insertion of the upper portions of the shafts 54 into the reference holes 58 as described above, referring to FIG. 2.

Since the conventional disc guide device includes separate devices for guiding a disc cartridge 40 and guiding a bare disc D', the overall structure is complex and numerous parts are required. Further, since the brackets 52 extending from both sides of the front end of the deck plate 32 are necessary for mounting the shafts 54 thereon, the machinery for fabricating the deck plate 32 needs to be sufficiently large to include the brackets 52, and as machinery size increases, manufacturing costs increase accordingly.

SUMMARY OF THE INVENTION

The present invention provides a disc guide device for a disc player, in which a device for guiding a disc cartridge and a device for guiding a bare disc are integrated, so that the overall structure is simplified and the manufacturing cost is reduced.

According to an aspect of the present invention, there is provided a disc guide device for a disc player, in which a disc cartridge and a bare disc are used, that separately guides and places the disc cartridge and the bare disc to predetermined positions on a disc player tray. The disc guide device includes: a guide hole located in the tray to correspond to a reference hole located in the disc cartridge; a disc guide, biased to protrude through the guide hole to extend above an upper surface of the tray; a protrusion capable of fitting through the reference hole; and a guide portion. When the bare disc is loaded on the tray, the guide portion projects through the guide hole, as a function of the bias, and contacts the circumference of the disc. And when a disc cartridge is loaded on the tray, the protrusion is inserted into the reference hole, and the guide portion is depressed so as to not protrude above the upper surface of the tray.

According to an aspect, a pair of the disc guide devices are provided on the tray.

According to another aspect, the guide portion and the protrusion are preferably integrated as a single unit.

According to yet another aspect, the protrusion has a lower portion that is approximately cylindrical, and an upper portion that is approximately conical.

According to a further aspect, the guide portion has a size and a shape that prevent it from being inserted into the reference hole. According to a yet further aspect, the guide portion has an approximately cylindrical shape with a diameter greater than that of the reference hole.

BRIEF DESCRIPTION OF THE DRAWINGS

These and/or other aspects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures. For convenience, the elements that are identical to those already described in connection with the conventional disc player will be briefly explained.

Figure 4:
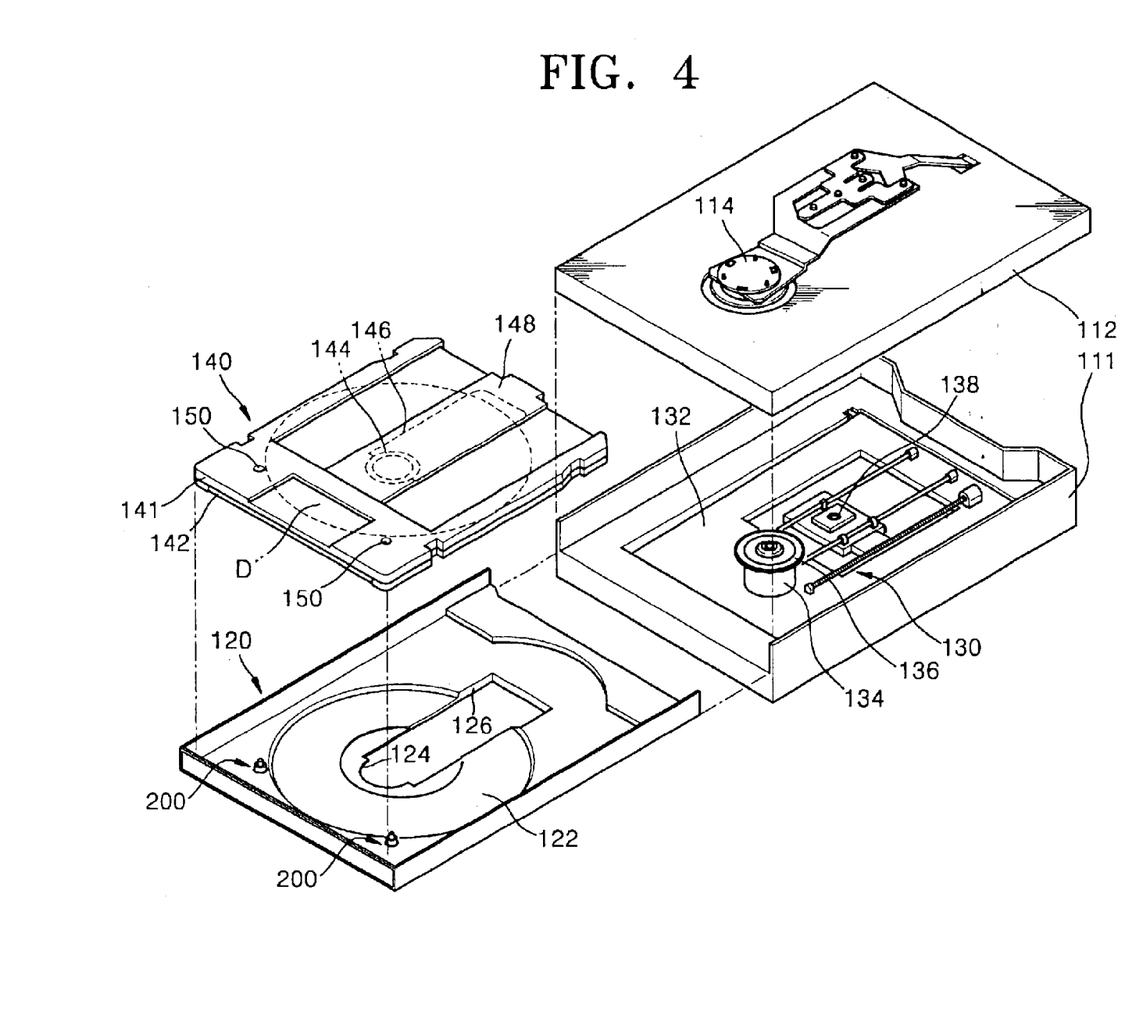
FIG. 4 is an exploded perspective view of a disc player incorporating a disc guide device according to an embodiment of the present invention.

Referring to FIG. 4, the disc player includes a tray 120 installed to move into or out of a housing 110 for carrying a disc cartridge 140 or a bare disc loaded on the tray 120. The housing 110 is comprised of a main frame 111 and a cover plate 112. A deck assembly 130, including a deck plate 132, a spindle motor 134, a turntable 136, and an optical pickup 138, is hinged with the main frame 111. Further, a disc clamp 114 and an opening lever (not shown) are mounted on the cover plate 112.

In the event that the disc cartridge 140 contains a double-sided disc D for recording or reading information on both sides of the disc, there are center holes 144, windows 146, and shutters 148 in both the upper and lower cases 141 and 142 forming a space for containing the disc D therein. In addition, a pair of reference holes 150 perforating the upper and lower cases 141 and 142 are formed in the disc cartridge 140. The reference holes 150 are provided in positions adjacent to and outside the circumference of the disc D to avoid interference with the disc D. As will be described below, protrusions 224 of disc guide devices 200 are inserted into the reference holes 150.

If the disc cartridge 140 contains a single-sided disc for recording information on only one side of the disc D, the window 146 may be provided only in the lower case 142, and the reference hole 150 is also only provided in the lower case 142.

A disc receptacle 122 is provided on the tray 120 for correctly placing the bare disc. Further, in correspondence with the center holes 144 and the windows 146 of the disc cartridge 140, respectively, the tray 120 has a center hole 124 and a window 126.

A disc guide device 200 is installed in the disc player having the structure as described above. Specifically, the disc guide device 200 is installed in a disc player in which a disc cartridge 140 and a bare disc can be compatibly used. The disc guide device 200 is installed in a position adjacent to and outside the circumference of the disc receptacle 122 of the tray 120. According to an aspect, as shown in FIG. 4, a pair of the disc guide devices are provided at both corners, adjacent to the front end of the tray 120.

Figure 5:
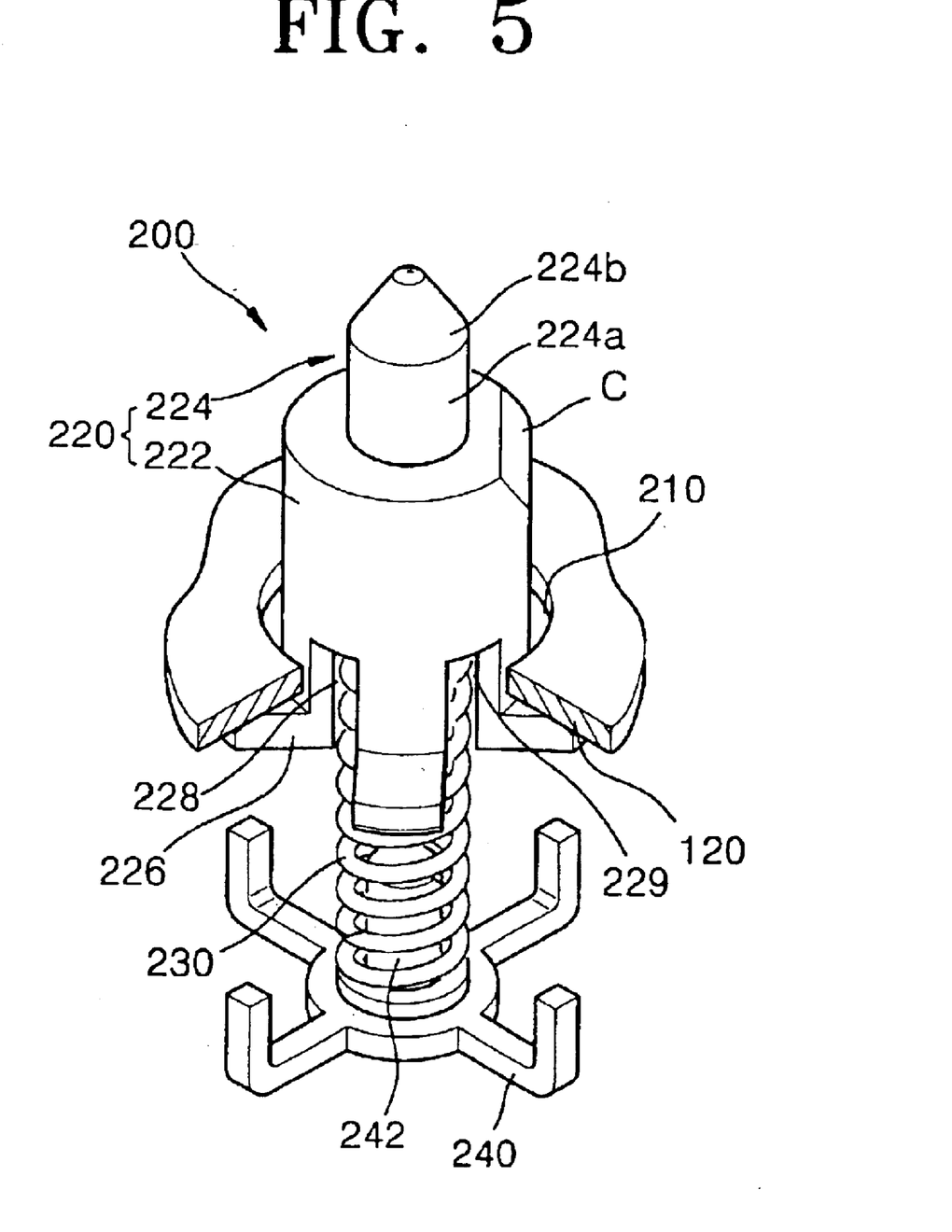
FIG. 5 is a partially broken perspective view of the disc guide device of FIG. 4.

The structure of the disc guide device according to the present invention will now be described in detail with reference to FIGS. 4 and 5.

The disc guide device 200 includes a disc guide 220 capable of guiding the disc cartridge 140 and a bare disc.

Further, the disc guide device 200 includes a guide hole 210 formed in the tray 120, a spring 230 for providing an upward elastic force to the disc guide 220, and a bracket 240 for supporting the spring 230.

The guide hole 210 is formed at the position adjacent to the outer circumference of the disc receptacle 122 of the tray 120 corresponding to the reference hole 150 formed in the disc cartridge 140. If there are two reference holes 150, two guide holes 210 are formed correspondingly. The guide hole 210 is formed to have a diameter slightly greater than that of the disc guide 220 so that the disc guide can freely move up and down.

The disc guide 220 includes a guide portion 222 for guiding a bare disc, which is inserted into the guide hole 210 and can move up and down therein, and a protrusion 224 for guiding the disc cartridge 140, which is provided on the top of the guide portion 222.

According to an aspect, the protrusion 224 is integrated with the guide portion 222 through a plastic molding process, thereby reducing manufacturing costs. The diameter of the protrusion 224 is formed slightly smaller than that of the reference hole 150 so that the protrusion 224 can be inserted into the reference hole 150.

Further, according to an aspect, the protrusion 224 has a lower section 224a and an upper section 224b. The lower section 224a of the protrusion 224 is formed to have a constant diameter to a predetermined height for minimizing a gap with the reference hole 150 so that the disc cartridge 140 is not easily vibrated while the tray 120 is loading the disc cartridge 140. The upper section 224b of the protrusion 224 is inclined to have the diameter decreasing upwardly so as to be easily inserted into the reference hole 150.

The guide portion 222 has a size and a shape sufficient to prevent the guide portion 222 from being inserted into the reference hole 150 of the disc cartridge 140. Thus, when the disc cartridge 140 is loaded on the tray 120, the guide portion 222 is pressed under the disc cartridge 140, and only the protrusion 224 is inserted into the reference hole 150. Although the guide portion 222 can have any shape, insofar as the above condition is satisfied, according to an aspect, the guide portion 222 has an approximately cylindrical shape, as shown in FIG. 5. In this case, the diameter of the guide portion 222 is formed to be slightly greater than that of the reference hole 150.

According to an aspect, the part of the upper edge of the guide portion 222 directed toward the center of the tray 120, i.e., the edge to be contacted the circumference of a bare disc loaded in the disc receptacle 122, is provided with a chamfer C. Thus, when a bare disc is loaded in the disc receptacle 122, the disc can be smoothly placed without interference from the upper edges of the guide portion 222.

To prevent the disc guide 220 from passing through the guide hole 210, projections 226 are formed at a lower end of the guide portion 222. The projections 226 contact the bottom of the tray 120 when the disc guide 220 is moved up by the elastic force of the spring 230 so that the disc guide 220 is prevented from moving farther. A plurality of projections 226 can be formed along the circumference of the guide portion 222 at predetermined intervals. Further, according to an aspect, grooves 229 are formed between the projections 226 to prevent interference of the disc guide 220 with the bracket 240 when the disc guide 220 is moved down.

In addition, a spring insertion hole 228 having a predetermined depth is formed at the bottom of the guide portion 222. The spring insertion hole 228 accommodates the spring 230 to provide an upward elastic force to the disc guide 220. According to an aspect, in consideration of the shape of the guide portion 222, a compressed coil spring is used as the spring 230.

The bracket 240 is installed under the bottom of the tray 120 so that the bracket 240 is placed below the guide hole 210 and supports the lower side of the spring 230. Further, according to an aspect, a spring support protrusion 242, around which the lower portion of the spring 230 is set, can be formed on the top of the center portion of the bracket 240.

The above-described disc guide device requires neither a separate device guiding the disc cartridge 140, like the conventional shafts 54 in FIG. 1, nor an additional device supporting the shafts 54, like the bracket 52 in FIG. 1 extending from the front end of the deck plate.

Figure 6A:
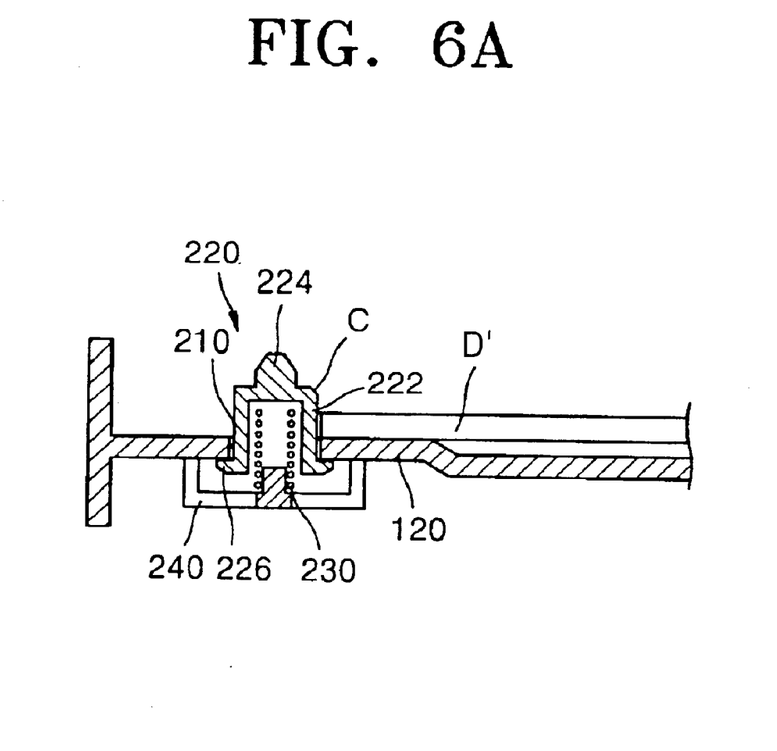
FIGS. 6A and 6B show operation of the disc guide device of FIG. 4 when a bare disc is loaded on the tray and when a disc cartridge is loaded, respectively.
Figure 6B:
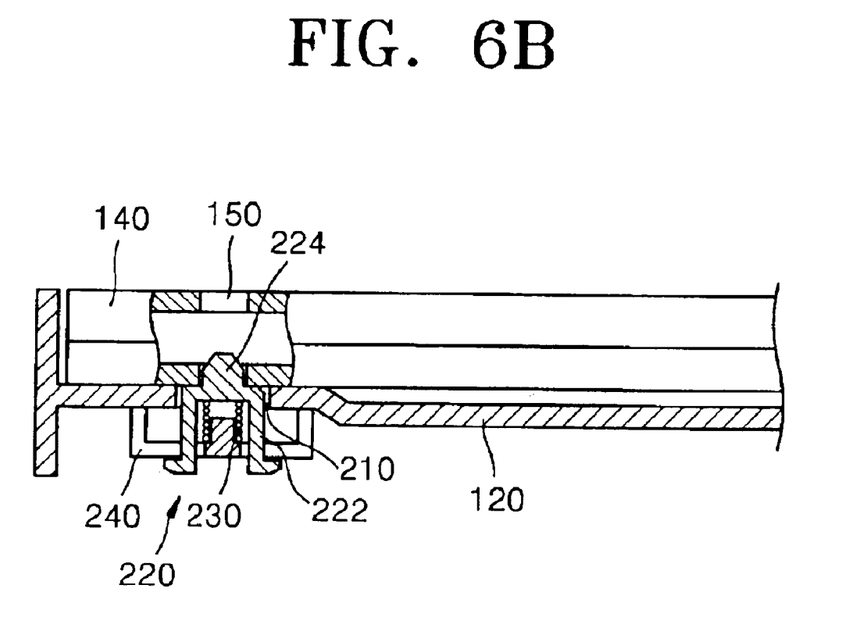

Operation of the disc guide device 200 will be described in detail with reference to FIGS. 6A and 6B. FIGS. 6A and 6B show operations of the disc guide device according to the present invention when a bare disc is loaded on the tray and when a disc cartridge is loaded, respectively.

Referring to FIG. 6A, when a bare disc D' is loaded on the tray 120, the disc guide 220 projects through and above the guide hole 210 formed in the tray 120 due to the elastic force of the spring 230. The circumference of the bare disc D' contacts a disc-side wall of the disc guide 222, and the disc D' is not displaced from a predetermined position, even when the tray 120 vibrates while moving. Further, since the projections 226 formed at the lower side of the guide portion 222 contact the bottom of the tray 120, the projected height of the disc guide 220 is limited so that the disc guide 220 cannot pass through the guide hole 210. In addition, since the chamfer C is formed at the upper edge of the guide portion 222, the disc D' can be smoothly placed on the tray 120 without interference from the upper edge of the guide portion 222.

Referring to FIG. 6B, when a disc cartridge 140 is loaded on the tray 120, the protrusion 224 of the disc guide 222 is inserted into the reference hole 150 formed in the disc cartridge 140, and the guide portion 222 is contacted and pressed by the bottom of the disc cartridge 140. As a consequence, the disc guide 220 moves down and compresses the spring 230, and the guide portion 222 is buried into the guide hole 210 formed in the tray 120. Therefore, only the protrusion 224 of the disc guide 220 is inserted into the reference hole 150 to correctly place the disc cartridge in a predetermined position.

As described above, according to the present invention, guiding the disc cartridge 140 and guiding the bare disc D' can both be performed by the disc guide 220 having the guide portion 222 and the protrusion 224. Therefore, the disc guide device according to the present invention has the following advantages.

First, as the device guiding the disc cartridge and the device guiding the bare disc are integrated in the disc guide, it is possible to manufacture the disc guide device with fewer parts than the number of parts used in conventional devices.

Second, as the bracket extending from the front end of the deck plate, which have been conventionally required, can be removed or reduced to a smaller size, it is possible to reduce the size of the machinery for fabricating the deck plate and the bracket, and thereby save manufacturing costs.

Third, as the conventional shafts made of metal are not required, it is possible to save manufacturing costs for fabricating the shafts. Further, as the process for spinning the shafts to the bracket is not required, it is possible to further reduce the manufacturing costs of the disc guide device.

Although a few preferred embodiments of the present invention have been shown and described, it will be understood by those of ordinary skill in the art that various changes may be made in this embodiment without departing from the principles and spirit of the invention, the scope of which is defined in the claims and their equivalents.

What is claimed is:

1. A disc guide device for a disc player, in which a disc cartridge and a bare disc are used, by which the disc cartridge or the bare disc is guided to and correctly placed in a predetermined position on a tray, the tray having a disc receptacle and a guide hole, the guide hole being located in the tray to correspond to a reference hole located in the disc cartridge, and the guide hole being located adjacent to and outside the circumference of the disc receptacle, the disc guide device comprising:

a disc guide, having:
  a guide portion that moves from a first position, wherein the guide portion protrudes through the guide hole and extends beyond a first surface of the tray, to a second position, wherein the guide portion does not protrude through the guide hole, and
  a protrusion provided on a first end of the guide portion;
a biasing element to bias the disc guide to protrude through the guide hole; and
a bracket provided at the tray to support the spring,
wherein when the bare disc is loaded on the tray, the guide portion protrudes through the guide hole and contacts the circumference of the bare disc, and
when the disc cartridge is loaded on the tray, the protrusion is inserted into the reference hole, and the guide portion is depressed by the disc cartridge and does not protrude through the guide hole.

2. The disc guide device according to claim 1, wherein:
a plurality of the disc guide devices are provided on the tray.

3. The disc guide device according to claim 1, wherein:
the guide portion and the protrusion are an integrated unit; and
the guide portion and the protrusion do not move with respect to each other.

4. The disc guide device according to claim 1, wherein:
the protrusion has a first portion that is approximately cylindrical, and a second portion that is approximately conical.

5. The disc guide device according to claim 1, wherein:
the guide portion has a size and a shape sufficient to prevent the guide portion from being inserted into the reference hole.

6. The disc guide device according to claim 5, wherein:
the guide portion has an approximately cylindrical shape with a diameter greater than that of the reference hole.

7. The disc guide device according to claim 1, further comprising:
a projection at a second end of the guide portion to limit the distance that the disc guide protrudes through the guide hole.

8. The disc guide device according to claim 1, further comprising:
a chamfer at an edge of the first end of the guide portion.

9. The disc guide device according to claim 1, wherein:
the guide portion has a biasing element insertion hole of predetermined depth located in a second end of the guide portion; and
the biasing element is inserted into the biasing element insertion hole.

10. The disc guide device according to claim 1, wherein:
the biasing element is a spring.

11. The disc guide device according to claim 1, wherein:
the biasing element is a compressed coil spring.

12. A disc guide device for a disc player, in which a disc cartridge and a bare disc are used, that separately guides the disc cartridge and the bare disc to predetermined positions on a disc player tray, wherein the tray has a disc receptacle and a guide hole located in the tray to correspond to a reference hole located in the disc cartridge, the disc guide device comprising:

a disc guide, biased to protrude through the tray guide hole to extend beyond a first surface of the tray, comprising:
  a protrusion capable of fitting through the reference hole, and
  a guide portion to contact the bare disc when the bare disc is placed in the disc receptacle,
wherein when the disc cartridge is loaded, the protrusion is inserted into the reference hole and the guide portion of the disc guide is depressed so as not to protrude above the first surface of the tray.

13. The disc guide device according to claim 12, wherein:
a plurality of disc guide devices are provided on the tray.

14. The disc guide device according to claim 12, wherein:
the guide portion and the protrusion are an integrated unit; and
the guide portion and the protrusion do not move with respect to each other.

15. The disc guide device according to claim 12, wherein:
the protrusion has a first portion that is approximately cylindrical, and an second portion that is approximately conical.

16. The disc guide device according to claim 12, wherein:
the guide portion has a size and a shape sufficient to prevent the guide portion from being inserted into the reference hole.

17. The disc guide device according to claim 16, wherein:
the guide portion has an approximately cylindrical shape with a diameter greater than that of the reference hole.

18. The disc guide device according to claim 12, further comprising:
a projection at a second end of the guide portion to limit the distance that the disc guide protrudes through the guide hole.

19. The disc guide device according to claim 12, further comprising:
a chamfer at an edge of a first end of the guide portion.

20. The disc guide device according to claim 12, wherein:
a spring biases the disc guide.

21. The disc guide device according to claim 20, wherein:
the guide portion has a spring insertion hole of predetermined depth located in a second end of the guide portion; and
the spring is inserted into the spring insertion hole.

22. The disc guide device according to claim 20, wherein:
the spring is a compressed coil spring.

23. A disc guide device for a disc player, in which a disc cartridge and a bare disc are used, comprising:
a guide portion, biased to protrude through a guide hole located on a disc player tray, that guides the bare disc to a predetermined position on the disc player tray; and
a protrusion, that corresponds to a reference hole located on the disc cartridge, and guides the disc cartridge to a predetermined position on the disc player tray,
wherein the protrusion is integrally formed with the guide portion.

* * * * *

UNITED STATES PATENT AND TRADEMARK OFFICE
CERTIFICATE OF CORRECTION

| | |
|---|---|
| PATENT NO. | : 6,954,937 B2 |
| APPLICATION NO. | : 10/438208 |
| DATED | : October 11, 2005 |
| INVENTOR(S) | : Tae-myun Kim et al. |

It is certified that error appears in the above-identified patent and that said Letters Patent is hereby corrected as shown below:

First Page, Col. 2 (Primary Examiner), Line 1, after "J" insert --.--.
Col. 8, Line 28, delete "an" and insert --a-- therefor.

Signed and Sealed this

Twenty-first Day of November, 2006

JON W. DUDAS
*Director of the United States Patent and Trademark Office*